(12) United States Patent
Grigoryan et al.

(10) Patent No.: US 10,127,501 B2
(45) Date of Patent: Nov. 13, 2018

(54) TRUST SCORE DETERMINATION USING PEER-TO-PEER INTERACTIONS

(71) Applicant: PAYPAL, INC., San Jose, CA (US)

(72) Inventors: Alex Grigoryan, San Jose, CA (US); Avinash Gangadharan, Fremont, CA (US); Akshay Peshave, Baltimore, MD (US); Michael Morgan, Fremont, CA (US); Rhys Howell, Falls Church, VA (US)

(73) Assignee: PAYPAL, INC., San Jose, CA (US)

( * ) Notice: Subject to any disclaimer, the term of this patent is extended or adjusted under 35 U.S.C. 154(b) by 259 days.

(21) Appl. No.: 14/985,343

(22) Filed: Dec. 30, 2015

(65) Prior Publication Data

US 2017/0195436 A1    Jul. 6, 2017

(51) Int. Cl.
*G06N 99/00*    (2010.01)
*G06F 17/30*    (2006.01)
*G06Q 20/40*    (2012.01)
*H04L 29/06*    (2006.01)

(52) U.S. Cl.
CPC ....... *G06N 99/005* (2013.01); *G06F 17/3053* (2013.01); *G06F 17/30486* (2013.01); *G06Q 20/4016* (2013.01); *H04L 63/08* (2013.01); *H04L 63/1483* (2013.01)

(58) Field of Classification Search
CPC .............................. H04L 67/22; H04L 67/104
USPC ......................................................... 709/204
See application file for complete search history.

(56) References Cited

U.S. PATENT DOCUMENTS

2010/0145836 A1* 6/2010 Baker ................. G06Q 10/067
                                                          705/30
2015/0220945 A1* 8/2015 Iannace ............. G06Q 30/0202
                                                          705/7.31

* cited by examiner

*Primary Examiner* — David Lazaro
*Assistant Examiner* — Zia Khurshid
(74) *Attorney, Agent, or Firm* — Haynes and Boone, LLP

(57) ABSTRACT

A system and method for determining confidence scores for accounts based on peer-to-peer interactions. One or more clustering algorithms are applied to a database of peer-to-peer interactions to identify and group related peer-to-peer interactions. A classifying algorithm is applied to a group resulting from the one or more clustering algorithms that classifies each peer-to-peer interaction within the group based on one or more relationships between the peer-to-peer interactions with the group. A score is provided to each transaction in the group based at least in part on the classification. The system uses the score to change functionality of at least one of the accounts associated with one of the transactions and/or provides information regarding the trustworthiness of a user of an account.

20 Claims, 6 Drawing Sheets

400

401
Obtain Transaction Information

402
Link Transactions

403
Filter Out Transactions Not Associated With User

404
Display

405
Provide Investigative Tools

TRUST SCORE DETERMINATION USING PEER-TO-PEER INTERACTIONS

RELATED APPLICATIONS

This present disclosure is related to concurrently filed U.S. patent application Ser. No. 14/985,369, filed Dec. 30, 2015, entitled "Trust Score Investigation", which is hereby incorporated by reference in its entirety.

TECHNICAL FIELD

The present disclosure generally relates to confidence determination tools based on peer-to-peer interactions.

BACKGROUND

Knowing the trustworthiness of an individual can be very important when making decisions. Every day people internally judge and gauge whether to trust someone for one thing or another. For example, people may make judgments on whom to trust with completing a task, keeping a secret, babysitting a child, overseeing valuable property, paying back a loan, etc. However, sometimes these judgments are incorrect. The judgments may be clouded by emotions, external unrelated factors that cause a bias, and/or the like. Thus, a system that provides investigative tools to help make better trust judgments based on objective information would be beneficial.

It would be beneficial if a system could log and track peer-to-peer interactions to provide objective information. However, as the internet has become more and more popular, the amount of data associated with peer-to-peer interactions may be enormous and difficult to analyze. Furthermore, the data associated with peer-to-peer interactions may not provide much information about each interaction. The information about each interaction may be limited. The data may not include information, such as the relationship between the peers, if the interaction is associated with another interaction, and/or the like. Thus, a system and method for predicting related peer-to-peer interactions for the purposes of identifying relevant information for aiding users to make trust based judgments would be beneficial.

Additionally, a system that is capable of analyzing the related information for providing easily understandable and objective metrics of trust and/or confidence between individuals would also be very beneficial. It would also be beneficial if a user were able to adjust the data points and/or provide input as to the value of the information being analyzed by the system to determine the objective metrics such that the user may focus the system on the most relevant data and aid the system in providing more accurate confidence measurements.

Furthermore, it would be beneficial to have a system and method that would be able to transfer trust determinations from one individual to another individual based on the interconnected individuals in between, even though the two individuals may not be directly connected.

Figure 1:
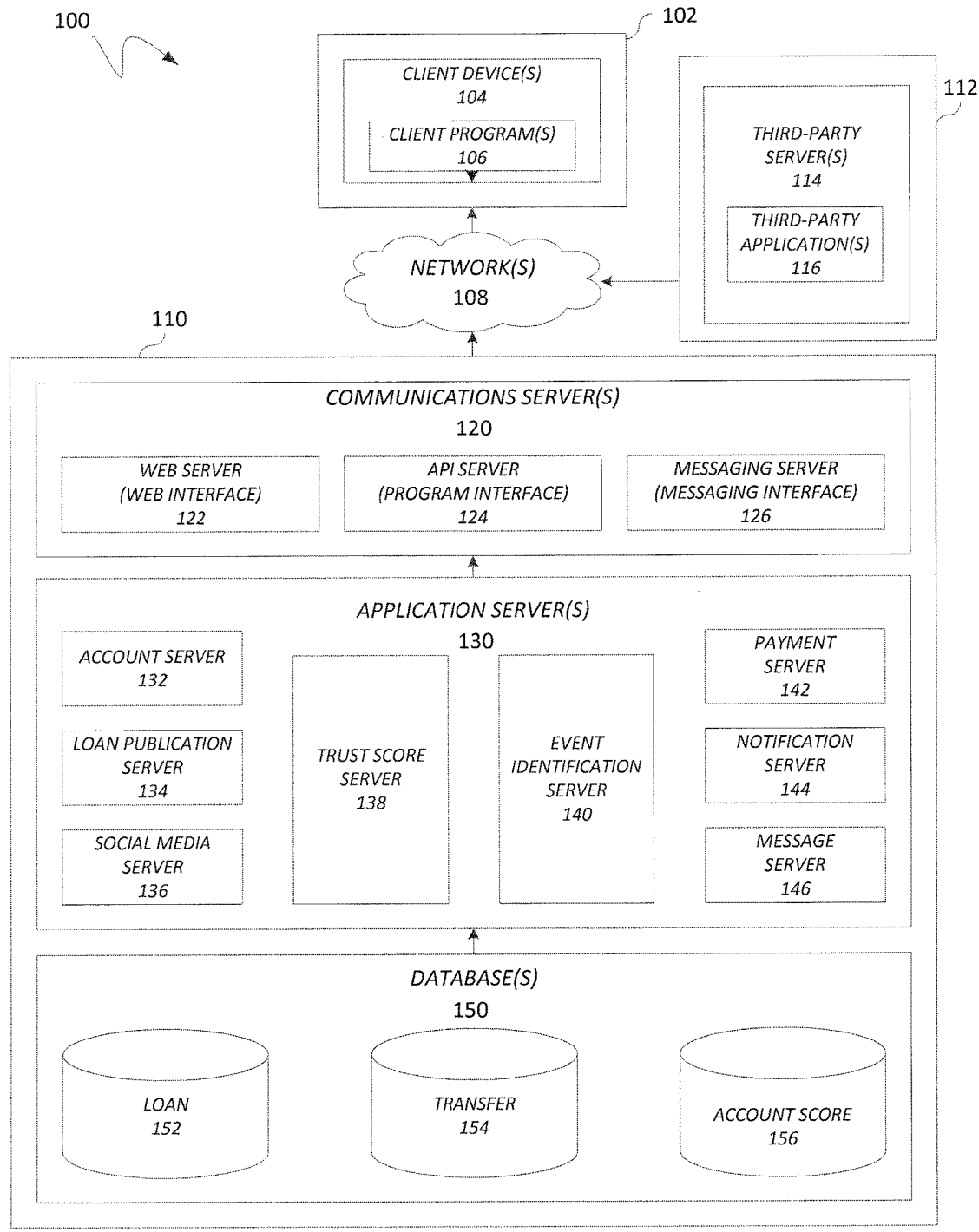
FIG. 1 is a block diagram of an exemplary computing system that is adapted for implementing a system for determining trust scores.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, components of a system and processes of a method for determining a trust score based on peer-to-peer transactions and/or interactions are disclosed. In some examples, the processes include predicting relationships between a plurality of transactions based on the recipient, the amount, and/or the time of the transactions. In some examples, the predictions may group, classify, cluster, and/or otherwise create a relationship for a subset of transactions. In some examples, the grouped transactions are classified again based on one or more of a time of the transaction and/or the transaction amount. Based on the classification within the subset, each transaction is provided a score. The scores may be associated with the account that sent the transaction. In some examples, the scores for each transaction may be normalized to a range of values, such as −1 to 1. In some examples the classification and the determined relationships between transactions may be determined using one or more clustering algorithms.

In some examples, the determined scores may be a confidence score between the directly connected sender and recipient. In some examples, the system may provide a score to a third party unrelated to the sender based on a relationship of the third party and the recipient and the relationship of the recipient and the sender. For example, a sender may have a first score associated with a recipient and the recipient may have a second score associated with the third-party, and the system may determine a score between the sender and the third-party based on the first score and second score. In some examples, a user may remove one or more transactions from the calculation of the confidence scores using a system provided graphical user interface. In response to removing one or more transactions, the system may recalculate a confidence score that does not depend on the removed transactions.

In some examples, the confidence scores may be used to indicate the risk in loaning money to a user of an account. In some examples, the confidence scores may be used to determine who a user of an account may want to or not want to borrow money from. In some examples, the confidence scores may affect interest rates of a peer-to-peer loan. In some examples, the score may affect the amount of credit a user has or the amount of currency that the user can borrow.

In some examples, the system may provide users with graphical user interface for aiding a potential lender to sift through users requesting loans. For example, the system may provide interfaces that allow the user to filter loans based on dollar amount, payment times, interest rates, confidence scores, relationships, historic transactions, and/or the like.

In some examples, the system may display a transaction map associated with a potential borrower. The transaction map may show some of the transaction events that the potential borrower is part of and transaction events that are associated with the user. In some examples, the transaction map may hide the identities of the users in each transaction, such that a potential lender may maintain anonymity.

FIG. 1 illustrates, in block diagram format, an exemplary embodiment of a computing system adapted for determining trust scores. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, Java OS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party servers 114 hosting a third-party applications 116 and third-party devices 118. In various implementations, third-party servers 114 and/or third-party applications 116 may host applications associated with or employed by a third party 112. For example, third-party servers 114 and/or third-party applications 116 may enable network-based system 110 to provide client 102 with additional services and/or information, such as transfer logging, message transferring, command recognition, security functions, and/or other services, some of which will be discussed in greater detail below. Third-party servers 114 and/or third-party applications 116 may also provide system 110 and/or client 102 with other information and/or services, such as notification services and/or information, social networking services and/or information, property transfer and/or handling, purchase services and/or information, and/or other online services and/or information.

In one embodiment, third-party servers 114 may include a social networking server that hosts a user's social network account. In another embodiment, third party-servers 114 may include an email server that hosts a user's email account. In yet another embodiment, third-party severs 114 may include one or more servers for aggregating user data and statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, web applications, account authentication, social networking, account management, trust score determinations, user investigation, payment tracking, community mapping and other services to users that access network-based system 110. In various embodiments, client 102 may communicate with applications servers 130 of network-based system 110 using one or more client devices 104 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party servers 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides trust and/or confidence determination, payment processing, peer-to-peer loan requests, loan management, loan enforcement, fraud detection, property transfer, notification, social connection services, and/or the like. Application server 130 of network-based system 110 may also provide services such as, account services, authentication services, content management services, payment services, user data gathering services, user mapping services, user investigation services, notification services, fund transfer, funds and/or currency exchanges, gifting services, and/or other services. Application servers 130 may include an account server 132, a trust score server 138, an event identification server 140, a payment server 142, a notification server 144, and/or a message server 146. Application servers 130 may further include a loan publication server 134, a social and/or a media server 136. These servers, which may be in addition to other servers, may be structured and arranged to aid in determining the trust worthiness of a user.

Application servers 130, in turn, may be coupled to and capable of accessing one or more databases 150 including a loan database 152, a transfer database 154, and/or user account score database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
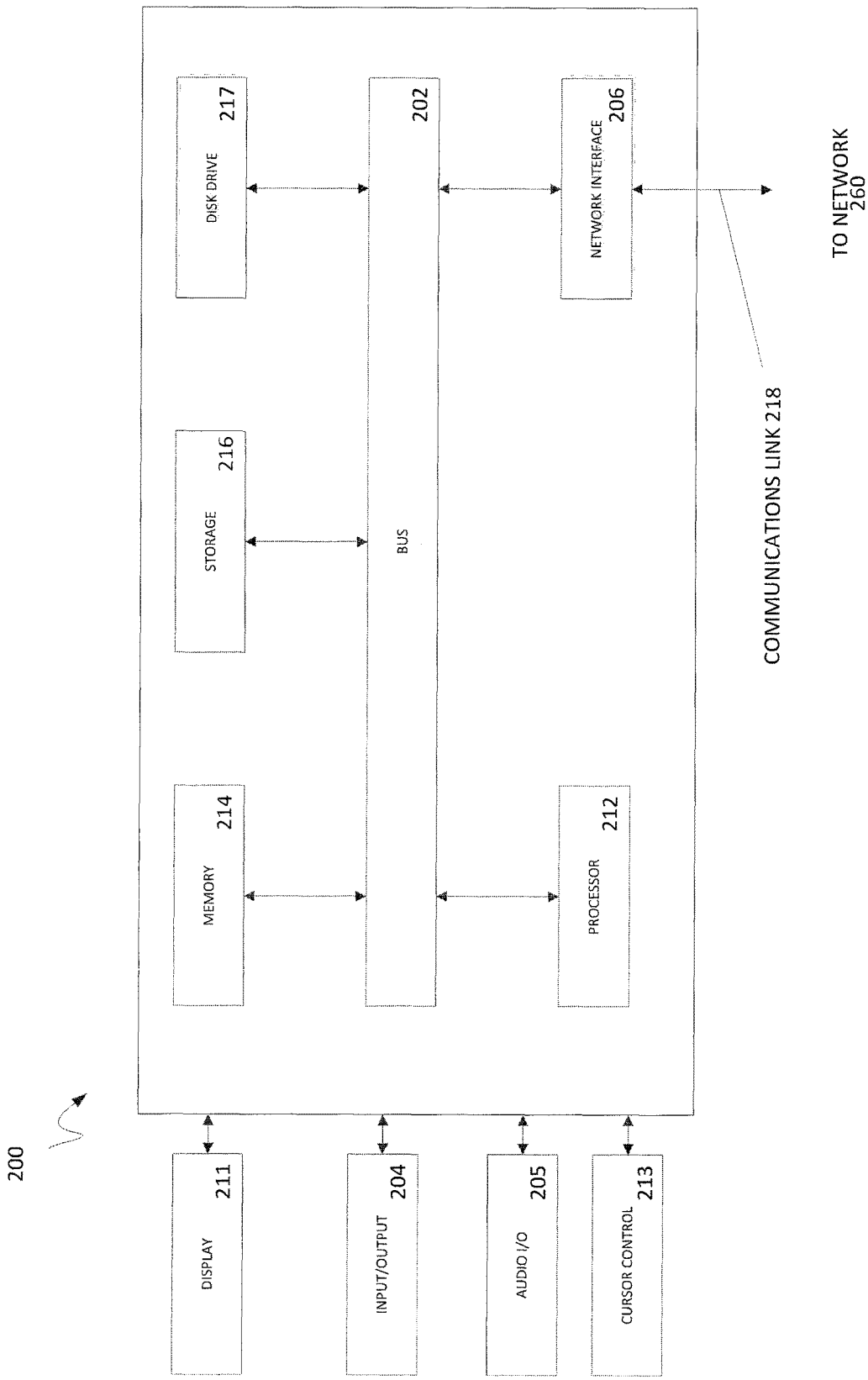
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a payment provider may utilize a network computing device (e.g., a network server) capable of communicating with the network. It should be appreciated that each of the devices utilized by users, service providers, and payment providers may be implemented as computer system 200 in a manner as follows.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touch screen, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a social networking server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (e.g., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
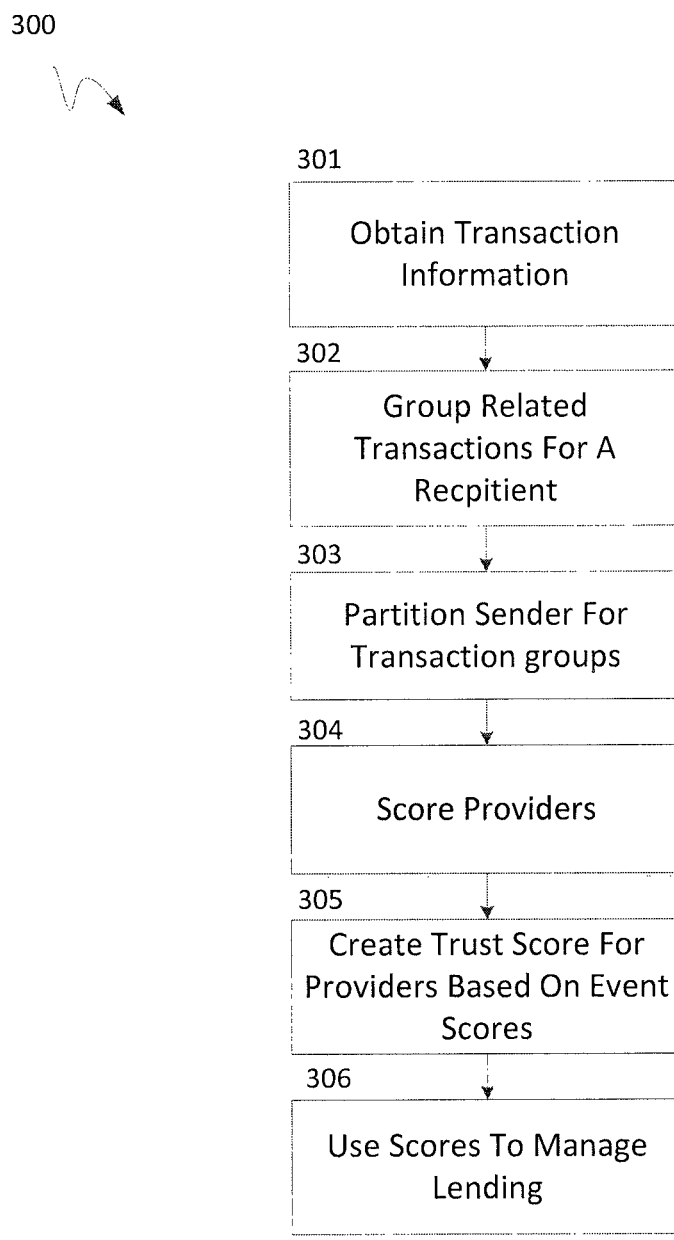
FIG. 3 is a flow diagram illustrating exemplary processes for determining a trust score.

FIG. 3 is a flow diagram illustrating processes 300 of an exemplary method of determining a trust score. Processes 300 may be implemented on or performed by a system such as system 100 of FIG. 1 according to some embodiments. According to some embodiments, processes 300 may include one or more of processes 301-305 which may be implemented, at least in part, in the form of executable code stored on a non-transitory, tangible, machine readable media that, when run on one or more processors, may cause a system to perform one or more of the processes 301-305.

In some examples, processes 300 may include process 301 for obtaining transaction information. In some examples, process 301 may obtain transaction information from logging and maintaining a database of peer-to-peer transactions from a payment system. For example, whenever an account transmits information, money, or another object from one account to another account, the system may receive and/or maintain a database with information regarding the transaction. In some examples, process 301 may obtain transaction information by accessing a transaction database held by a payment provider, third-party, or any other database coupled to the system.

In some examples, transaction information may include identifiers associated with the sending and/or receiving accounts (e.g. username, e-mail address, account number, and/or the like), user identifiers associated with the sender and receiver (e.g. name, nickname, full name, address, social security number, banking information and/or the like), transaction time (e.g. time of transfer, time of transfer request, time of transfer completion, and/or the like), a transaction amount or identifier for a transaction object, transaction identifier (e.g. transaction number), user provided transaction notes (e.g. comments, special instructions, and/or the like), location information (e.g. GPS coordinates of the device during a transaction), and/or the like.

At process 302, the system may determine which transactions from the obtained transactions are related based on the transaction information of each transaction. In some examples, the system may determine related transactions based on the recipient, time of the transactions, and/or transaction amounts. In some examples, the system may be configured to predict which transactions that were conducted to a particular recipient are related using information data that cannot confirm the relationship, sometimes referred to as imperfect data. For example, a first person may have paid for dinner on behalf of a party using a credit card, and the bill may have been split amongst the party to be paid back to the recipient through another payment provider. Each individual in the party may use the payment provider to transfer funds and/or pay for their share of the dinner to the recipient. However, the payment provider may not receive information from the party members that the money being transferred is related to a repayment for the dinner. The transaction information may provide insufficient data to completely verify that one transaction is related to another transaction or the dinner. Thus, the payment provider is missing important data that would otherwise relate multiple transactions together, and instead has imperfect data or information regarding what each payment is associated with. Furthermore, the recipient may have paid for dinner for other parties and received reimbursement from other dinners or events through the payment provider as well, which adds another level of difficulty in determining which transactions are related.

In some examples, the system may predict which transactions are related from the imperfect information and group the related transactions at process 302. In some examples, the system may predict which transactions are related and/or group the related transactions based on transaction information of each transaction. In some examples, the system may predict which transactions are related and group transactions based on a combination of the recipient, the amount, and/or time of the transaction.

In some examples, the system may cluster transactions for a particular recipient based on the transaction amount and the time of the transaction. In some examples, these may be transactions where the recipient is receiving the transaction. In some examples, the system may cluster the transactions to a recipient using an expectation-maximum (EM) clustering algorithm based on time and amount. In some examples, another unsupervised clustering algorithm may be used. In some examples, the related transaction groups may be determined by conducting a first clustering on the transactions based on time and then clustering the resultant clusters from the first clustering based on amount.

In some examples, the order in which the clustering is conducted may affect the resultant grouped transactions. In some examples, the system may cluster the transactions first based on time and then based on amounts after. In this manner, transactions with coincidentally identical amounts but with large time differences may not be clustered together or grouped as related transactions. In some examples, the system may cluster first based on an amount and then cluster the resulting clusters based on time. In this manner, the system may be able to identify related transactions that may have large time differences. For example, several individuals may be paying identical subscription fees to a recipient; however, the payment dates may be different for each individual and the regular payments may be separated by weeks, months, or longer. Clustering based on amount first and then by time would be more likely to group these types of transactions into a cluster.

In some examples, the clustering may be conducted in a manner such that every account and/or user within the transaction cluster is unique. In some examples, if more than one transaction for a particular account is grouped in a cluster, the system may remove one of the transactions from the cluster. In some examples, the system may determine which transaction to remove from the cluster based on a temporal relationship, value relationship, and/or a combination thereof. For example, the system may drop the transaction that has the largest difference from the average transaction times of the cluster. In some examples, the system may drop the transaction that has the largest difference from the average transaction amount of the cluster. In some examples, the system may drop the transaction with the largest summed normalized difference of the transaction amount and transaction time in relation to the average of the cluster. In this manner, the system may predict which transaction is more likely a payment for a dinner or another transaction event, because it is unlikely that a sender would make two separate transactions for a single event.

In some examples, at process 303, the system may determine one or more partitions for one or more of the resultant clusters and/or groups from process 302 for classifying and/or categorizing senders within the groups. In some examples, the senders may be classified into two or more groups based on time, such as early payer and late payer. In some example there may be more than two groups, such as early payer, regular/intermediate payer, and later payer. In some examples, the number of groups may depend on the number of senders within the group. In some examples, the partitions may be based on the mean transaction time of each category of of transactions within the cluster. In some examples the partition time may be based on an earliest time of the senders within the cluster and/or groups.

In some examples, the system may determine the partitions using a clustering and/or classification algorithm where the number of classifications may be specified, such as K-Means, on one of the resultant clusters from process 302.

In some examples, the system may dynamically choose the number of partitions based on the number of senders within the group. For example, when there are two senders, the system may choose a single partition that separates the two senders and creates two classifications. In some examples, when there are more than two senders, a different number of partitions may be determined allowing for a different number of classifications. In some examples, the system may set the number of partitions determined by selecting a number for K when clustering with a K-Means algorithm. K may be dynamically chosen based on the number of senders within the group being clustered. In some examples, K may be determined based on one more threshold number of senders. For example, K may be 2 for two senders, 3 for when there are more than two senders but less than ten, 4 for more than ten senders, and so forth. In some examples, K may be set and predetermined. In some examples, the system may set the classification number to 3.

In some examples, the clustering algorithm and may cluster and classify based on the time of the transaction for each of the transactions within the cluster. The partition may separate the senders into groups, such as early payers, normal payers, and late payers. The number of groups and/or classifications may depend on the number of partitions. In some examples the partitions may be represented by a time that separates the senders based on the transaction time for each sender.

At process 304, each of the senders may be provided an event score for each transaction within the groups determined in process 302. In some examples, the event scores may depend on the partitions determined at process 303 for each group. In some examples, the event score may be determined based at least in part on the time difference between the transaction associated with the sender and the time of one or more partitions determined at process 303. In some examples, the event score may depend at least in part on the number of senders similarly classified. In some examples, the event score may depend at least in part on the amount of the transaction.

In some examples, the event score for each transaction may be calculated with the following equations:

$$\frac{\Delta \text{transaction } t * \text{Normalization Factor}}{\text{Partition } t}, \quad \text{EQ1}$$

$$\frac{\Delta \text{transaction } t * \text{Normalization Factor}}{\text{Max Transaction Time}}, \text{ and} \quad \text{EQ2}$$

$$\text{Normalization Factor} = \left(1 - \frac{\text{\# Transactions In Same Classification}}{\text{Total \# of Transactions}}\right). \quad \text{EQ3}$$

In the above equations, "Δtransaction t" is calculated by subtracting a partition time with the time of a transaction, "Partition t" is the time of a partition, "max transaction time" is the max transaction time of the transactions within the group, "# transactions in same classification" is the number of transactions with the same classification as the transaction that is being scored, and "Total # of Transactions" is the total number of transactions in the group.

EQ1 may be used to calculate the event scores for transactions with transaction times under the time of the partition. EQ2 may be used to calculate the event scores for transactions with transaction times over the time of the partition. In this manner, transactions within the partition time would receive a positive score and transactions outside of the partition time may receive a negative score. In some examples, if a transaction outside of the partition time is within a predetermined amount of time, the event score for that transaction may be switched to zero or an average of the associated account instead of a negative score. In this manner, there is not always a penalty to the sender of every transaction group. For example, if everyone paid within an hour and a late payer paid two hours later, the late payer is still paying within a reasonable amount of time, and therefore, should not be penalized with a negative score. In some examples, the system may ignore scores for payments outside of a partition time but within a predetermined reasonable time. In some example, the predetermined reasonable time may be based on the average "$\Delta$transaction t" for all transactions in the database. In some examples, the predetermined reasonable amount of time may be based on the average positive "$\Delta$transaction t" values of all transactions in the database. In examples, the predetermined reasonable amount of time may be based on the average and/or positive average "$\Delta$transaction t" values of all transactions in the database that have a similar value (e.g. within a predetermined value amount) and/or a value equal to or less than the max or average value of the group. In some examples, the predetermined reasonable time may be based on one or more of the above methods of determining a reasonable amount of time but using "$\Delta$transaction t" from within the community of the recipient and/or sender instead of the entire database. The community may be determined using a community determination algorithm, such as the Louvain Method, on the entire database based on number of transactions and/or cash flow. In some examples, the predetermined reasonable amount of time may be set by an administrator.

At process 305, the system may create a trust score for an account based at least in part on the event scores the account is associated with at process 304. The number of event scores associated with the account at process 305 may depend on the number of different transaction groups determined at process 302 that the account is associated with and/or a part of. In some examples, the trust score may be the average event score associated with the account. In some embodiments, the trust score may depend at least in part on a cash flow amount between the sender and each lender, a cash flow for the lenders within a community, and/or a cash flow for the lenders outside of a community.

In some examples, the trust score may be a weighted average historical event score per unit value for an account. In some examples, the trust score may be a weighted average historical event score for a particular borrower (sender) lender (receiver) pair. In some examples the average historical event score for a borrower lender pair may be calculated with the following equation:

$$\text{Average\_Event\_Score}(L, B) = \frac{\sum_{i}^{n} \text{Event\_Amount}_i * \text{Event\_Score}(L, B)_i}{\sum_{i}^{n} \text{Event\_Amount}_i}$$

$$w = \frac{\text{fractional}_{flow(L,B)} + \text{fractional}_{flow(B,L)}}{2}$$

$$\text{fractional}_{flow(L,B)} = \frac{\psi(L, B)}{\psi_{in_{cmty}(L,*)} + \psi_{out_{cmty}(L,*)}}$$

$$\text{fractional}_{flow(B,L)} = \frac{\psi(B, L)}{\psi\_in\_cmty(B, *) + \psi\_out\_cmty(B, *)}$$

Trust score = $w * \text{Average\_Event\_Score}(L, B)$

Wherein Event_Amount$_i$ is the total amount for event i; Event_Score(L,B)$_i$ is the event score of the borrower for event i with lender L. $\psi$(L,B) is the total cash flow from lender to borrower; $\psi$(B,L) is the total cash flow from borrower to lender; $\psi$_in_cmty(L,*) is the total cash flow from lender to users within the same community as the lender; $\psi$_out_cmty(L,*) is the total cash flow between lender to users outside of or not a part of the community of L; $\psi$_in_cmty(B,*) is the total cash flow between borrower and users in the same community as the borrower; $\psi$_out_cmty(B,*) is the total cash flow between the borrower to users that are not in or outside of the same community as the borrower. The communities may be determined using a community determination algorithm, such as the Louvain Method, on the entire database based on number of transactions and/or cash flow. In this manner, a trust score between a particular sender (borrower) and lender (recipient) may be calculated and weighted and adjusted for cash flow between the lender and borrower, the borrower and lender's level of trust and/or risk appetite inside and outside of their respective community. Also, in this manner, the trust score of a potential borrower may be calculated and tailored to the particular lender and their interactions between the lender and the potential borrower.

In some examples, the system may also calculate a trust score for another lender who may not have ever transacted with a particular borrower. In some examples, the trust score may be an average of all trust scores associated with the borrower. In some examples, the trust score may be calculated by transferring a trust score through mutual connections. In other words, if A has a trust score of x with B and B has a trust score of y with C, a trust score between A and C may be calculated based on x and y. In some examples there may be multiple middle men B, and the trust score may be an average of the transferred trust scores. In some examples, the trust score may be transferred through multiple hops, for example A to D may require a transfer of scores from A to B, then B to, then C to D.

In some examples, the trust score between A and C with middlemen B may be calculated with the following equation:

$$\text{Trust\_Transfer}(A, C) = \frac{\sum_{B \in middlemen} (\text{Event\_Score}(A, B) * \text{Event\_Score}(B, C))}{\text{\# of middle men}}$$

Wherein middlemen are all the direct common peers between A and C; # middlemen is the total number of middle men, Event_Score(A,B) is the event score between A and B, Event_Score(B,C) is the event score between B and C. In this manner, an average transferred event score is determined based on each common peer B within middlemen.

Furthermore, the above equation can be expanded to include multiple hops. Using the transferred trust score A to C, a trust score could be transferred to user D. As such, a trust score can be transferred from A to D when D has two degrees of separation from A. Furthermore, this equation can also be extrapolated to transfer trust scores over n degrees of separation. In some examples, a penalty on the trust score may be assessed for every degree of separation. In some examples, the penalty may be predetermined and/or set by the administrator. For example, 90% of the trust score may be transferred at each hop.

At process 306, the system may use the scores to manage peer-to-peer lending. In some examples, the system may display the trust score to potential lenders when the account is used to request a loan. In some examples, the system may transform the trust score into a more easily understood or summarized metric for potential lenders to use. Such as: red/yellow/green for high/med/low risk. In this manner, the privacy of a borrower may be protected as well as add integrity of the actual score and prevent individuals from gaming the system for better scores due to the lack of feedback.

In some examples, the system may determine limits on which other accounts the account can request loans from. In some examples, the system may determine when to allow for the account to request loans based on the trust score. In some embodiments, the system may determine a maximum loan amount based on the trust score. In some embodiments, an interest rate for the loan may be determined based on the trust score.

In some examples, instead of trust score being calculated, loyalty scores can be determined. In such a case, instead of peer-to-peer transactions, the algorithm could be applied to consumer to merchant transactions. Clusters may still be based on transaction amounts and transaction times, but the transactions would be between consumer and merchant rather than peer-to-peer. The time partitions may be based on purchase time with respect to initial listing time (rather than transfer time and earliest transfer time). The loyalty scores may be calculated in the same manner as before, where instead of early payer having a higher trust score, the earlier purchaser would have a higher loyalty score. The borrower and recipient would be switched to consumer and merchant respectively. In this manner, a merchant may be able to determine which customers are the most loyal and reward such customers.

Figure 4:
FIG. 4 is a flow diagram illustrating an exemplary implementation of a trust investigative tool.

FIG. 4 is a flow diagram illustrating processes 400 of an exemplary implementation of a trust investigation tool for investigating the trust score of a potential borrower. Processes 400 may be implemented on a system such as system 100 of FIG. 1 according to some embodiments. According to some embodiments, processes 400 may include one or more of processes 401-405 which may be implemented, at least in part, in the form of executable code stored on a non-transitory, tangible, machine readable media that, when run on one or more processors, may cause a system to perform one or more of the processes 401-405.

At process 401, the system may obtain and/or access a plurality of transactions. In some examples, the transactions may be peer-to-peer transactions of a payment system. The system may obtain and/or access transactions from a database. In some examples, the database may be stored and/or maintained by a third party. In some examples, the database may be stored and/or maintained by the system when transaction information is received, which may be from a third party.

At process 402, a transaction map may be created using the obtained transactions. The transaction map may display nodes and/or indicators for each unique account, the cash flow amount, the direction of transactions, and/or the like. In some examples, the map may provide identifiers displaying who the sender and/or recipient of the transactions were. In some examples, the sender and/or recipients may be shown in the transaction map anonymously. There may be an indicator that one or more of the accounts displayed in the map are interested in a loan, but the identity may be hidden. For example, each node and/or account may be represented by a number unrelated to the account and/or user of the account. The number may change and may be created by a random number generator. An exemplary transaction map is discussed in more detail below.

At process 403, the portion of the transaction map associated with the borrower may be displayed to the potential lender. In some examples, the system may remove the transactions that the borrower is not a part of from the transaction map determined at process 402. Such a transaction map may have the borrower in the center of the map with an arrow to and/or from other accounts representing one or more transactions the borrower has conducted with those other accounts.

In some examples, the system may filter out based on transaction events that the user/potential lender is not a part of. Transaction events may be determined in a similar manner as describe in process 302 of FIG. 3. As such an example, each transaction event that the user/potential lender is part of may be displayed along with the other account transactions that were part of the same transaction event as the borrower.

In some examples, the display may be provided through a web page or an application on the device of the lender. The display may also have an interface such as actuatable elements, buttons, sliders, and/or the like to navigate the transaction map.

At process 404, the user/potential lender may interact with the transactions shown by being able to remove some transactions and/or group of transactions. In some examples, the system may allow the potential borrower to filter for certain transactions, remove certain transactions, and/or remove/filter out certain transaction events. For example, filtering for multiple transactions, transactions over a certain amount, filtering out transaction events over or under a certain amount, filtering out transaction events that include certain accounts, and/or the like. In some examples, the system may allow the potential lender to filter transactions in the transaction map based on degrees of separation.

At process 405, the system may recalculate the trust score of the potential borrower as one or more transactions and/or transaction events are removed. This trust score may be displayed to the user/potential lender.

Figure 5:
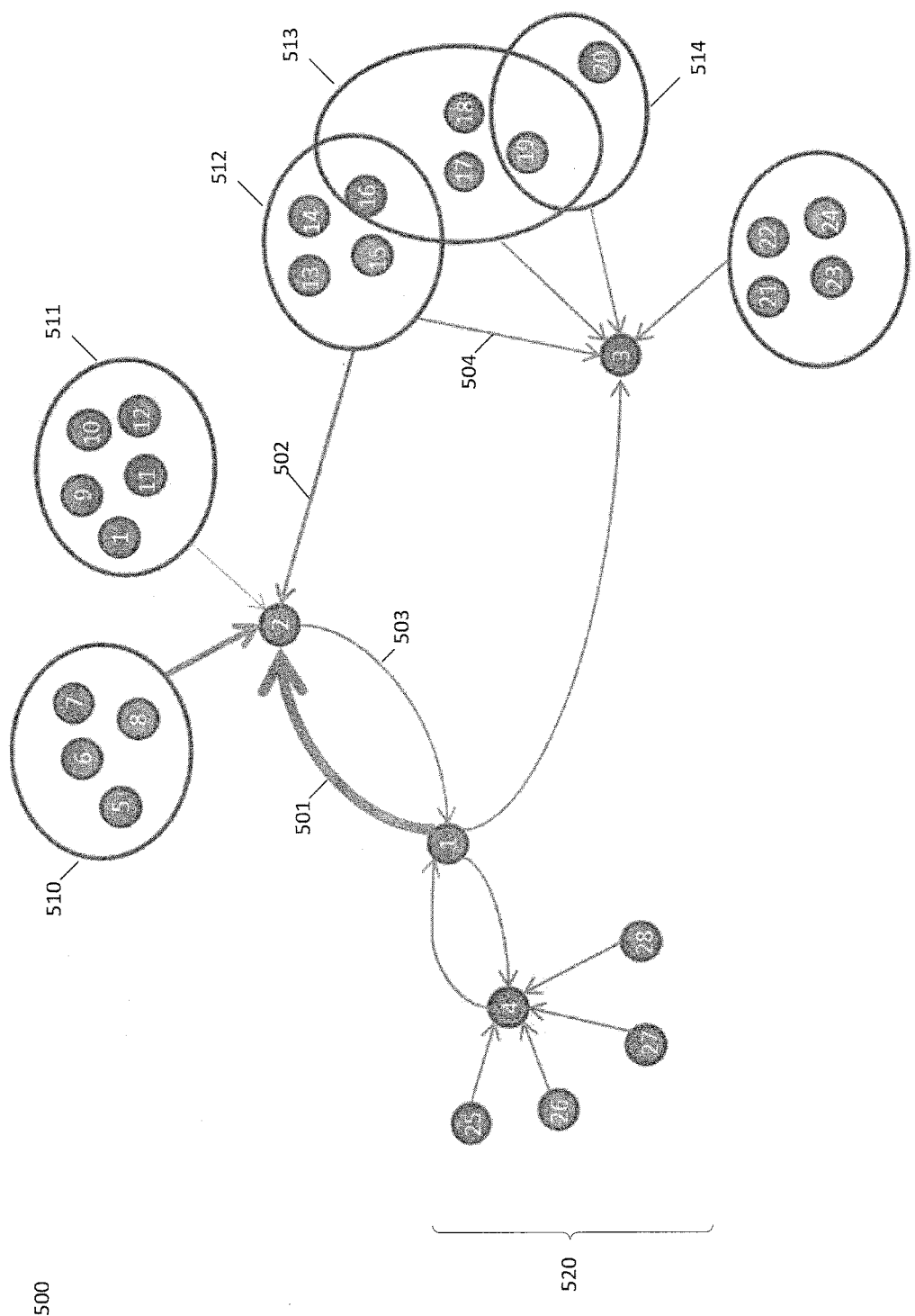
FIG. 5 illustrates an exemplary transaction map for a graphical user interface, which may be implemented with the trust investigative tool of FIG. 4.

FIG. 5 illustrates an exemplary transaction map 500 for a graphical user interface displayed to a potential lender when investigating a potential borrower, such as the borrower represented by icon 1.

In some examples, GUI 500 may highlight and/or otherwise identify the potential borrower from the other accounts with icons 2-28 in transaction map 500. In some examples, the icon for the potential borrower, icon 1, maybe a different color than icons for other accounts 2-28, may be bolded, or have another identifying feature. In some examples, the system may assign potential borrowers that are being investigated with the same number, such as the number 1, independent of the identity of the borrowers. In this manner, the number may indicate which icon is associated with the borrower. In some examples, if the potential lender's account is part of the transaction map shown by transaction map 500, the system may highlight that icon as well to indicate that the potential lender may be associated with the potential borrower through one or more communities and/or connections. In some examples, the actual accounts and/or users associated with each transaction in GUI 500 may be hidden and kept anonymous. In this manner, a potential lender may be able to investigate whether it would be safe to lend money to a potential borrower, such as potential borrower 1, while still maintaining the privacy of the potential borrower associated with icon 1 and the other accounts associated with icons 2-28.

Transaction map 500 may also display arrows, such as arrows 501, 502, and 503, indicating the direction in which transactions occur. In some examples, the arrows may indicate the amount of the transfer. For example, a bigger arrow may indicate a larger transfer than a smaller arrow. As shown in FIG. 5, arrow 501 is larger than arrow 502 indicating that the transaction(s) and/or cash flow represented by arrow 501 is larger than the transaction(s) and/or cash flows represented by arrow 502. Similarly, arrow 502 is larger than arrow 503, indicating the transaction(s) and/or cash flow represented by arrow 502 is larger than the transaction(s) and/or cash flow associated with arrow 503.

In some examples, transaction map 500 may group transactions from multiple accounts into a transaction event and provide an indicator that the accounts are part of a transaction event. For example, indicator 510 groups transactions with accounts associated with icons 5, 6, 7, and 8 as part of a transaction event that was associated with potential borrower represented by icon 1. As shown, icon 1 for the potential borrower is separated from transaction event indicator 510 even though the potential borrower may be part of transaction event 510. A viewer or potential lender viewing of transaction map 500 may understand that the potential borrower is part of each transaction event, such as the transaction event identified by indicator 510, because the viewer or potential lender may understand that transaction map 500 is displaying a transaction map of transaction events associated with potential borrower represented by icon 1.

In some examples, an icon for borrower 1 may also be shown as part of the transaction event, as shown by icon 1 within the transaction event identified by indicator 511. In some examples, transaction map 500 may overlap transaction event indicators when one or more accounts are part of multiple transaction events. For example, as shown the account represented by icon 16 is part of event 512 and 513, while the account represented by icon 19 is part of event 513 and 514. In some examples, transaction map 500 may not group transactions by transaction events, as shown by transactions 520.

In some examples, transaction arrows, such as transaction arrow 501, may be actuatable elements that may cause the system to perform one or more functions upon actuation. For example, hovering and/or clicking arrow 501 may display the transaction amount and/or cash flow amount represented by arrow 501. In some examples, transaction map 500 may allow a user to remove one or more transactions and/or transaction events from the transaction map. In some examples, a transaction and/or transaction event may be removed in response to a user deleting one of the arrows. For example, a user may select arrow 502 and request transactions associated with arrow 502 to be deleted. In response, the system may update GUI 500 to remove transaction arrow 502 and transaction event 512 from transaction map 500. In some examples, transaction map 500 may update trust scores and/or transaction amounts associated with one or more accounts represented by icons 1-28 when a transaction is deleted or filtered out of the transaction map.

In some examples, transaction map 500 may allow for a user to filter out transactions associated with one or more accounts. For example, a user may request that transactions associated with the account represented by icon 16 be removed. The system in response may remove transaction event 512 and 513 from the transaction map. As such, accounts associated with icons 13-18 may be removed from the transaction map because there are no other transactions those icons are associated with that does not include the account represented by icon 16. However, the account associated with icon 19 would still remain due to transaction event 514, which is unrelated with the account represented by icon 16.

In some examples, one or more icons 1-28 in GUI 500 may be actuatable and/or selectable. In response to an actuation and/or selection, transaction map 500 may be configured to display information regarding the account. The information may include the trust score, total lending and borrowing of the account, total monetary transfers, when the account was created, whether the account is within the same community as the lender and/or borrower, and/or the like.

Figure 6:
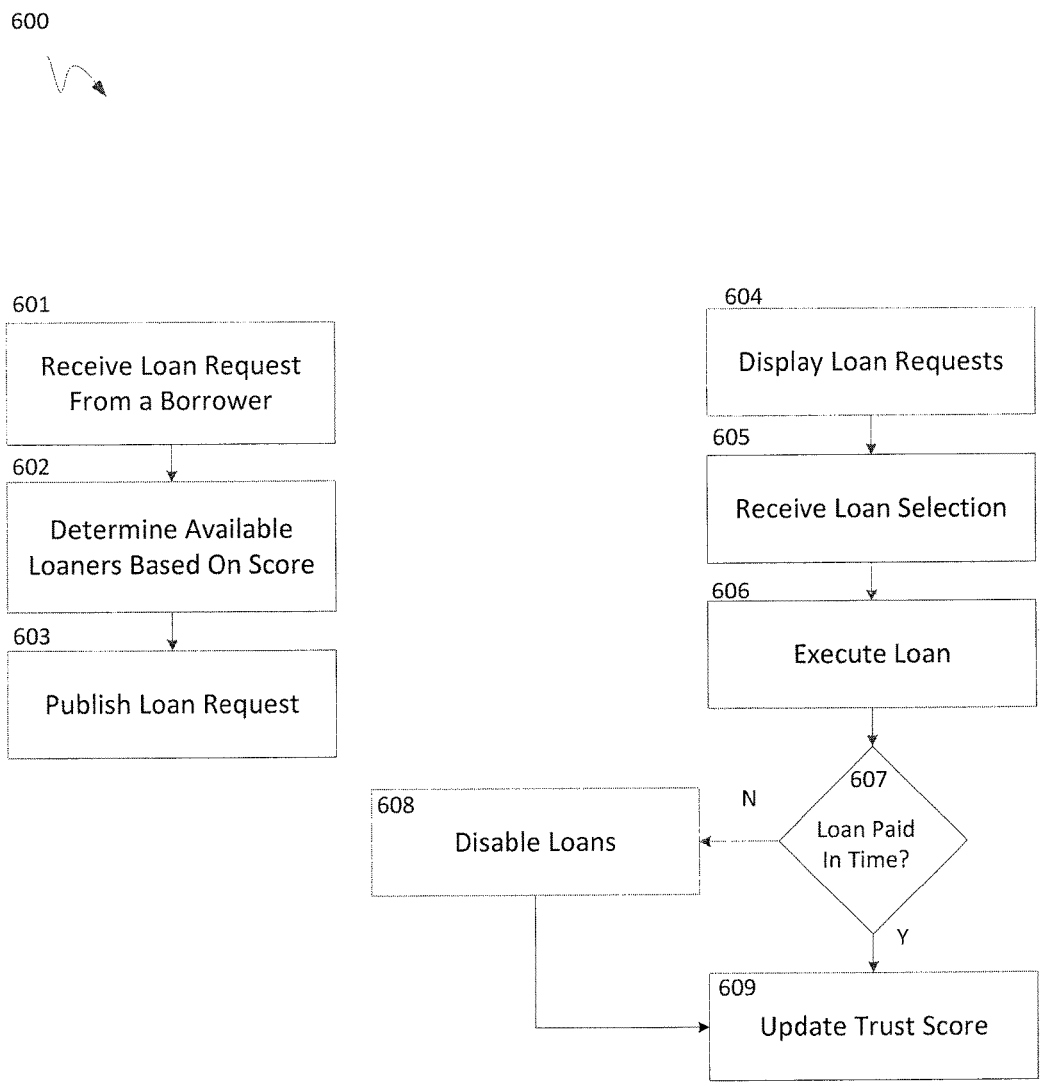
FIG. 6 is a flow diagram illustrating exemplary processes for facilitating peer-to-peer loans integrating trust scores.

FIG. 6 illustrates exemplary processes 600 for orchestrating a peer-to-peer loan using a trust score, such as the trust score determined at process 305 of FIG. 3. According to some embodiments, processes 600 may include one or more of processes 601-609 which may be implemented, at least in part, in the form of executable code stored on a non-transitory, tangible, machine readable media that, when run on one or more processors, may cause a system to perform one or more of the processes 601-609.

Process 600 may include process 601 wherein the system receives a loan request from a borrower. In some examples, the loan request may include borrower defined parameters, such as loan amount, payback time frames, payment plans, interest rates, and/or the like.

In some examples, the system may suggest parameters based on some of the user provided parameters and/or historic loans that the system may have logged in a database. For example, based on a loan amount, the system may suggest a payback time frame. The payback timeframe suggestion may be based on an average payback time for similar loan amounts logged in the database.

In some examples, the system may suggest one or more of the parameters based on the trust score that the borrower has. For example, the interest rate for the loan may be based on the percent of loans in the database with similar trust scores that were paid back on time.

At process 602, the system may determine which loaners, lenders, or creditors the borrower may have access to for publication. In some examples, when a borrower has a trust score beyond a threshold value, the system may not allow the borrower to request a loan. In some examples, the system may have tiers of loaners which may be unlocked based on the trust score of a borrower. For example, a first tier may include only loaners who have transacted with the borrower over a threshold amount of times and/or a threshold value amount. A second tier may include loaners that have not transacted with the borrower (e.g., strangers), but for a small threshold amount. A third tier may increase the loan amount to loaners that the borrower has not transacted with. In some examples, the system may use the tiers to unlock access to loaners beyond increasing degrees of separation from the community of the borrower.

At process 603, the system may publish the loan to potential loaners that the system determined as available to the borrower at process 602. In some examples, the system may send an alert to the lenders indicating that the borrower is requesting a loan. In some examples, the alert may be sent to individuals that are connected in some manner to the borrower, such as loaners who have transacted with the borrower previously.

At process 604, the system may display loan requests available to a borrower on a device of the loaner. In some examples, the loan request may be displayed on the device of the loaner when the device accesses and/or interfaces with an application associated with the system. In some examples, the system may provide a GUI that allows the loaner to filter the displayed loan requests based on one or more criteria. For example, the GUI may allow the loaner to filter loan requests based on degrees of separation from the loaner, loan requests from borrowers that the loaner has previously transacted with, borrowers above or below a certain trust score, when the account of the borrower was set up, number of transactions conducted by the borrower, whether the borrower has had a late payment on a loan, and/or the like.

At process 605, the system may receive a loan selection from the loaner. In response, the system may provide the loaner a summary of the loan and a confirmation request that the loaner intends to execute the loan. In some examples, the system may allow for the loaner to negotiation one or more parameters of a loan request with a loaner. The system may provide a communication channel for the negotiation, such as a private chat window, instant messaging, email, and/or the like.

At process 606, in response to receiving the confirmation at process 605, the system may execute the loan. In some examples, the system may cause a payment provider to transfer money from an account of the loaner to an account of the borrower. The system may also keep track of the loam by logging the details of the loan in a database. The system may also implement a time frame and/or payment plan for the loan to be repaid.

At process 607, the system may determine whether the loan was paid back within the time frame set and/or in accordance with the payment plan determined at process 606. In response to the loan not being paid within the time frame or the payment plan, the system may continue to process 608. In response to the loan being paid within the time frame, the system may continue to process 609.

At process 608, the system may disable the account of the borrower from requesting any more loans until the loan is paid back. Additionally, system may update the trust score of the borrower to reflect the unpaid/late paid loan. For example, the system may change the trust score for the borrower to an untrusted score, such as zero. In some examples, the system may provide the borrower a grace period to repay a loan. In some examples, the grace period may be provided for borrowers where the late payments are uncharacteristic. For example, the system may provide a grace period to borrowers with above average trust scores and/or borrowers that have a history of paying loans back on time.

At process 609, the trust score for the borrower may be updated based on when the repayment of the loan occurs. In some examples, the system may reinstate loan capabilities to the borrower, and/or change the maximum loan amount approved by the borrower.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer implemented method comprising:
   receiving, by one or more hardware processors, a transaction request from a first user device associated with a first user;
   obtaining, by the one or more hardware processors, a plurality of transactions related to the first user, wherein each transaction in the plurality of transactions comprises a time, an amount, a recipient identifier corresponding to a recipient in the transaction, and a sender identifier corresponding to a sender in the transaction;
   identifying, by the one or more hardware processors, a first set of related transactions from the plurality of transactions based on a first recipient identifier, wherein a particular one of the first set of related transactions has a sender identifier that corresponds to the first user;
   determining, by the one or more hardware processors, at least one partition that separates transactions in the first set of transactions into at least two categories;
   determining, by the one or more hardware processors, a score for the first user based at least in part on the at least one partition;
   determining, by the one or more hardware processors, a set of candidates available to enter into a transaction with the first user based on the score determined for the first user, wherein the set of candidates comprises a second user;
   generating, by the one or more hardware processors, an interactive transaction map having nodes and directional edges based on the plurality of transactions, wherein each node in the interactive transaction map represents at least one of a sender or a recipient in at least one transaction in the plurality of transactions, wherein each directional edge represents a transaction flow in a transaction from the plurality of transactions, and wherein the first set of related transactions is grouped based on a visual indicator in the interactive transaction map; and
   presenting, by the one or more hardware processors, the interactive transaction map on a second device of the second user.

2. The computer implemented method of claim 1, wherein the at least one partition is represented by a unit of time.

3. The computer implemented method of claim 2, wherein the score is determined based at least in part on a difference between a time associated with the particular one of the first set of transactions and the unit of time.

4. The computer implemented method of claim 1, wherein identifying the first set of related transactions comprises generating a cluster result by applying a first unsupervised clustering algorithm on the plurality of transactions based on a temporal dimension.

5. The computer implemented method of claim 4, wherein identifying the first set of related transactions further comprises applying a second unsupervised clustering algorithm on the cluster result.

6. The computer implemented method of claim 1, wherein determining the at least one partition comprises applying a k-means algorithm on the first set of related transactions based on a temporal dimension.

7. The computer implemented method of claim 1, further comprising:
receiving, via the interactive transaction map from the second device, a user input indicating a removal of a node or a directional edge;
modifying the interactive transaction map based on the user input;
adjusting the score for the first user based on the modified interactive transaction map; and
presenting the adjusted score on the second device.

8. A system, comprising:
a non-transitory memory; and
one or more hardware processors coupled to the non-transitory memory and configured to read instructions from the non-transitory memory to cause the system to perform operations comprising:
receiving a transaction request from a first user device associated with a first account;
determining, for the first account, a plurality of transaction event clusters by applying an unsupervised clustering algorithm to a plurality of transactions, wherein transactions within each transaction event cluster are determined to be related to each other based at least in part on a time element associated with the plurality of transactions, and wherein each transaction event cluster comprises a transaction associated with the first account;
determining, for the first account, a plurality of event scores based on the plurality of transaction event clusters;
determining, for the first account, a confidence score based at least in part on the plurality of event scores;
determining a set of account candidates available to enter into a transaction with the first account based on the confidence score determined for the first account, wherein the set of account candidates comprises a second account;
generating a transaction map having nodes and directional edges based on the plurality of transaction event clusters, wherein each node in the transaction map represents a party in at least one transaction in the plurality of transactions, wherein each directional edge represents a transaction flow in a transaction from the plurality of transactions, and wherein nodes associated with a transaction event cluster are grouped based on a visual indicator in the transaction map; and
presenting, by the one or more hardware processors, the transaction map on a second user device associated with the second account.

9. The system of claim 8, wherein the unsupervised clustering algorithm is applied to the plurality of transactions based at least in part on a temporal dimension.

10. The system of claim 8, the operations further comprising enabling the first account to access an account functionality based on the confidence score.

11. The system of claim 8, wherein determining the plurality of event scores comprises determining a first event score for a first transaction event cluster based at least in part on a relationship between a first transaction associated with the first account in the first transaction event cluster and at least a second transaction unassociated with the first account in the first transaction event cluster.

12. The system of claim 11, wherein the operations further comprise determining, for the first transaction event cluster, a partition associated with a first time based on the relationship.

13. The system of claim 12, wherein the first transaction is associated with a second time indicating when the first transaction occurred, and wherein the first event score is determined based at least in part on a difference between the second time and the first time associated with the partition.

14. The system of claim 11, wherein the confidence score is determined based at least in part on a total cash flow associated with the first transaction.

15. A non-transitory machine readable medium having stored thereon machine readable instructions executable to cause a machine to perform operations comprising:
receiving a transaction request from a first user device associated with a first account;
determining, for the first account, a plurality of transaction event clusters by applying a clustering algorithm to a plurality of transactions, wherein transactions within each transaction event cluster are determined to be related to each other based at least in part on a time element of the plurality of transactions, and wherein each transaction event cluster comprises a transaction associated with the first account;
determining, for the first account, a plurality of event scores based on the plurality of transaction event clusters;
determining, for the first account, a confidence score based at least in part on the plurality of event scores;
determining a set of account candidates available to enter into a transaction with the first account based on the confidence score determined for the first account, wherein the set of account candidates comprises a second account;
generating a transaction map having nodes and directional edges based on the plurality of transaction event clusters, wherein each node in the transaction map represents a party in at least one transaction in the plurality of transactions, and wherein each directional edge represents a transaction flow in a transaction from the plurality of transactions; and
presenting, by the one or more hardware processors, the transaction map on a second user device associated with the second account.

16. The non-transitory machine readable medium of claim 15, wherein the clustering algorithm is applied to the plurality of transactions based at least in part on a temporal dimension.

17. The non-transitory machine readable medium of claim 15, wherein the confidence score is determined further based on a relationship between the first account and the second account.

18. The non-transitory machine readable medium of claim 15, wherein determining the plurality of event scores comprises determining a first event score for a first transaction event cluster based at least in part on a relationship between a first transaction associated with the first account in the first transaction event cluster and at least a second transaction unassociated with the first account in the first transaction event cluster.

19. The non-transitory machine readable medium of claim 18, wherein the operations further comprise determining, for the first transaction event cluster, a partition associated with a first time based on the relationship.

20. The non-transitory machine readable medium of claim 19, wherein the first transaction is associated with a second time indicating when the first transaction occurred, and wherein the first event score is determined based at least in part on a difference between the second time associated with the first transaction and the first time associated with the partition.

* * * * *